(12) United States Patent
Fagan

(10) Patent No.: US 10,736,368 B2
(45) Date of Patent: Aug. 11, 2020

(54) DISTRESSED FABRIC PATCH AND METHOD

(71) Applicant: Jennifer J. Fagan, Scottsdale, AZ (US)

(72) Inventor: Jennifer J. Fagan, Scottsdale, AZ (US)

(*) Notice: Subject to any disclaimer, the term of this patent is extended or adjusted under 35 U.S.C. 154(b) by 0 days.

(21) Appl. No.: 16/216,935

(22) Filed: Dec. 11, 2018

(65) Prior Publication Data
US 2019/0104786 A1 Apr. 11, 2019

Related U.S. Application Data

(63) Continuation-in-part of application No. 14/743,219, filed on Jun. 18, 2015, now Pat. No. 10,149,507.

(51) Int. Cl.
*B29C 73/10* (2006.01)
*B29C 65/18* (2006.01)
(Continued)

(52) U.S. Cl.
CPC .............. *A41D 27/08* (2013.01); *A41D 1/06* (2013.01); *A41D 1/067* (2013.01); *A41D 27/12* (2013.01);
(Continued)

(58) Field of Classification Search
CPC ......... B29C 73/00; B29C 73/04; B29C 73/10; B29C 65/00; B29C 65/02; B29C 65/18; B29C 65/44; B29C 65/48; B29C 65/4815; B29C 65/4835; B29C 65/50; B29C 65/5021; B29C 65/5057; B29C 66/00; B29C 66/41; B29C 66/43; B29C 66/45; B29C 66/47; B29C 66/472; B29C 66/4722; B29C 66/4724; B29C 66/729; B29C 66/74; B29C 66/7485; B29C 66/1122; B29C 66/435; A41H 27/00; A41H 43/04; B32B 7/14; B32B 7/05; B32B 27/40; B32B 5/024; B32B 2437/00; B32B 2451/00; B32B 2556/00; B32B 2255/02; B32B 2305/188; B32B 2305/18
USPC ........ 156/60, 63, 65, 70, 88, 91, 92, 93, 94, 156/98, 148, 153, 247, 249, 250, 252, 156/256, 267, 277, 289, 290, 291, 293,
(Continued)

(56) References Cited

U.S. PATENT DOCUMENTS 3,138,505 A 6/1964 Hirsch
3,565,741 A * 2/1971 Jaray ...................... B29C 70/00
428/114
(Continued)

OTHER PUBLICATIONS

Website page, products: distressed denim jeans (7 pages).
(Continued)

*Primary Examiner* — Philip C Tucker
*Assistant Examiner* — Brian R Slawski
(74) *Attorney, Agent, or Firm* — Bycer Law, PLC; Matthew L. Bycer

(57) ABSTRACT

Many garments made of denim material have factory created one or more discontinuities exposing a group of parallel threads and referred to as "distressed denim". Sometimes, some or all of these threads become torn or rips or tears occur in the denim garment to create a discontinuity. A patch to cover the discontinuity is made of a plurality of side by side threads attached to one side of an adhesive panel and fabric material is attached to the other side of the adhesive panel. The threads, or entire patch, may be printed with indicia.

11 Claims, 5 Drawing Sheets

(51) Int. Cl.
| | |
|---|---|
| B29C 65/48 | (2006.01) |
| B29C 65/50 | (2006.01) |
| B29C 65/00 | (2006.01) |
| A41H 27/00 | (2006.01) |
| A41H 43/04 | (2006.01) |
| B32B 7/14 | (2006.01) |
| B32B 5/02 | (2006.01) |
| B32B 27/40 | (2006.01) |
| B32B 37/00 | (2006.01) |
| A41D 27/08 | (2006.01) |
| B32B 7/12 | (2006.01) |
| B32B 5/12 | (2006.01) |
| A41D 1/06 | (2006.01) |
| C09J 7/21 | (2018.01) |
| C09J 7/29 | (2018.01) |
| C09J 7/35 | (2018.01) |
| C09J 5/06 | (2006.01) |
| C09J 7/40 | (2018.01) |
| G09F 3/10 | (2006.01) |
| A41D 27/12 | (2006.01) |

(52) U.S. Cl.
CPC ............... *B32B 5/12* (2013.01); *B32B 7/12* (2013.01); *C09J 5/06* (2013.01); *C09J 7/21* (2018.01); *C09J 7/29* (2018.01); *C09J 7/35* (2018.01); *C09J 7/405* (2018.01); *G09F 3/10* (2013.01); *A41H 27/00* (2013.01); *A41H 43/04* (2013.01); *B29C 65/18* (2013.01); *B29C 65/4815* (2013.01); *B29C 65/5021* (2013.01); *B29C 65/5057* (2013.01); *B29C 66/1122* (2013.01); *B29C 66/4722* (2013.01); *B29C 66/4724* (2013.01); *B29C 66/729* (2013.01); *B29C 66/7485* (2013.01); *B29C 73/10* (2013.01); *B32B 5/024* (2013.01); *B32B 7/14* (2013.01); *B32B 27/40* (2013.01); *B32B 2255/02* (2013.01); *B32B 2305/18* (2013.01); *B32B 2437/00* (2013.01); *B32B 2451/00* (2013.01); *B32B 2556/00* (2013.01); *C09J 2201/61* (2013.01); *C09J 2400/263* (2013.01); *C09J 2475/00* (2013.01)

(58) Field of Classification Search
USPC ......... 156/307.1, 307.7, 308.2, 308.4, 331.7; 428/63, 40.1, 41.7, 42.1, 42.2, 195.1, 196, 428/200, 201, 202, 292.1, 297.4, 297.7, 428/298.1, 300.7, 301.4; 442/149, 150, 442/151

See application file for complete search history.

(56) References Cited

U.S. PATENT DOCUMENTS

| | | | | |
|---|---|---|---|---|
| 3,598,689 | A | * | 8/1971 | Feffer ................ A41B 3/10 428/167 |
| 4,094,316 | A | | 6/1978 | Nathanson |
| 4,153,750 | A | * | 5/1979 | Piquilloud ............. B32B 5/08 428/107 |
| 4,199,640 | A | * | 4/1980 | Goldman ............... D04H 3/10 156/148 |
| 4,224,370 | A | * | 9/1980 | Heinemann ........... B41N 10/04 428/364 |
| 4,244,996 | A | | 1/1981 | Maloney |
| 4,307,145 | A | * | 12/1981 | Goldman ............... B32B 5/06 442/30 |
| 4,595,438 | A | * | 6/1986 | Kent .................... D04H 3/04 156/148 |
| 4,715,914 | A | | 12/1987 | Viner |
| 4,917,745 | A | | 4/1990 | Speer |
| 6,261,396 | B1 | | 7/2001 | Fessenden et al. |
| 6,439,363 | B1 | * | 8/2002 | Nels .................... B32B 5/08 192/113.36 |
| 6,713,144 | B2 | | 3/2004 | Bundo et al. |
| 6,777,055 | B2 | | 8/2004 | Janssen et al. |
| 2009/0223622 | A1 | | 9/2009 | Llano |
| 2014/0255466 | A1 | | 9/2014 | Mukobata et al. |
| 2015/0047769 | A1 | | 2/2015 | Quinn et al. |
| 2015/0072114 | A1 | | 3/2015 | Llano |

OTHER PUBLICATIONS

Website page, Denimsandjeans.com, (denim trends, reports, news & more), copyright 2014 (13 pages).
Website page, Rawr Denim, www.rawrdenim.com, copyright 2015 (11 pages).
Website page, Zazzle Inc., http://www.zazzle.com, copyright 2000-2015 (11 pages).

* cited by examiner

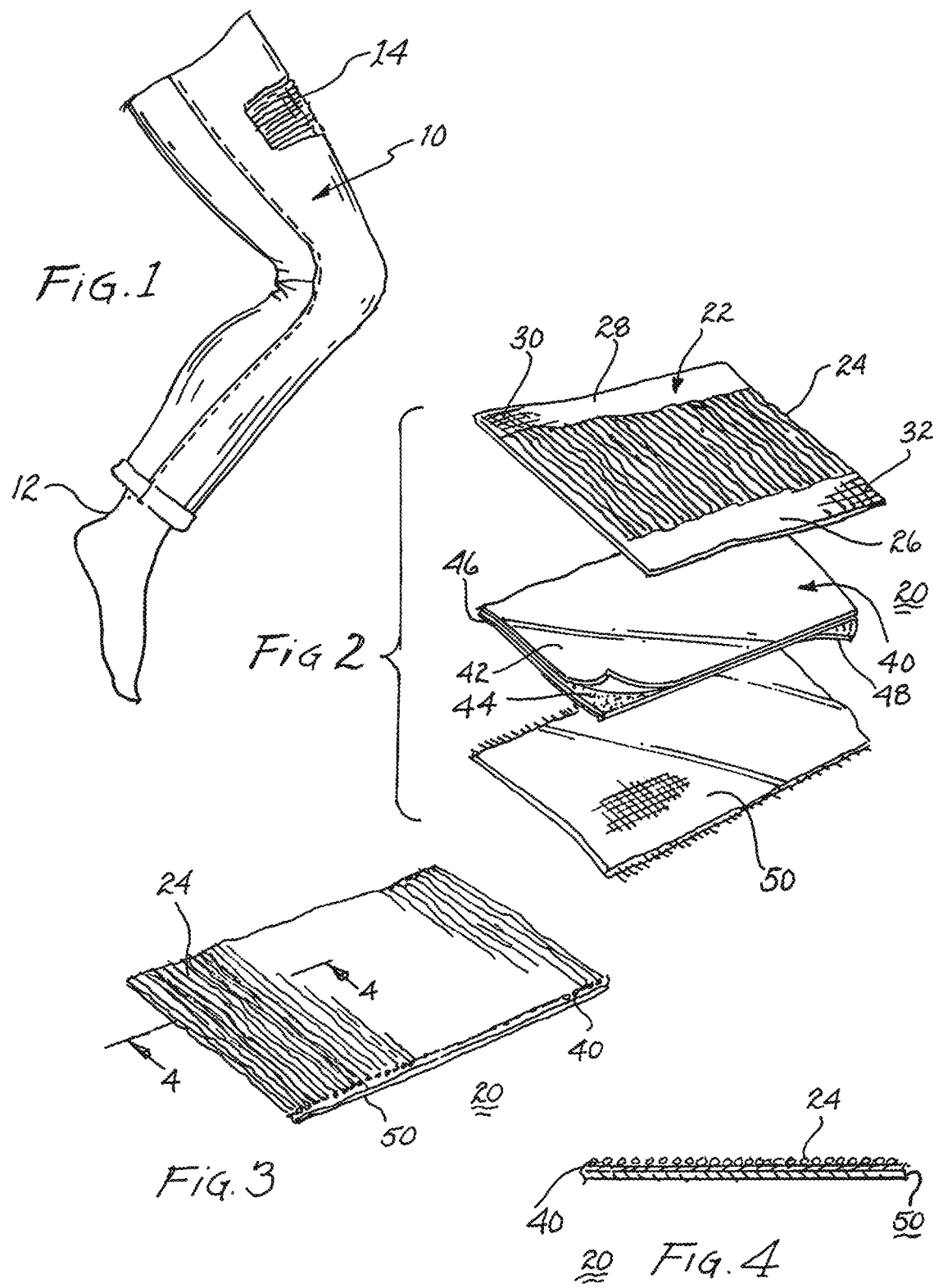

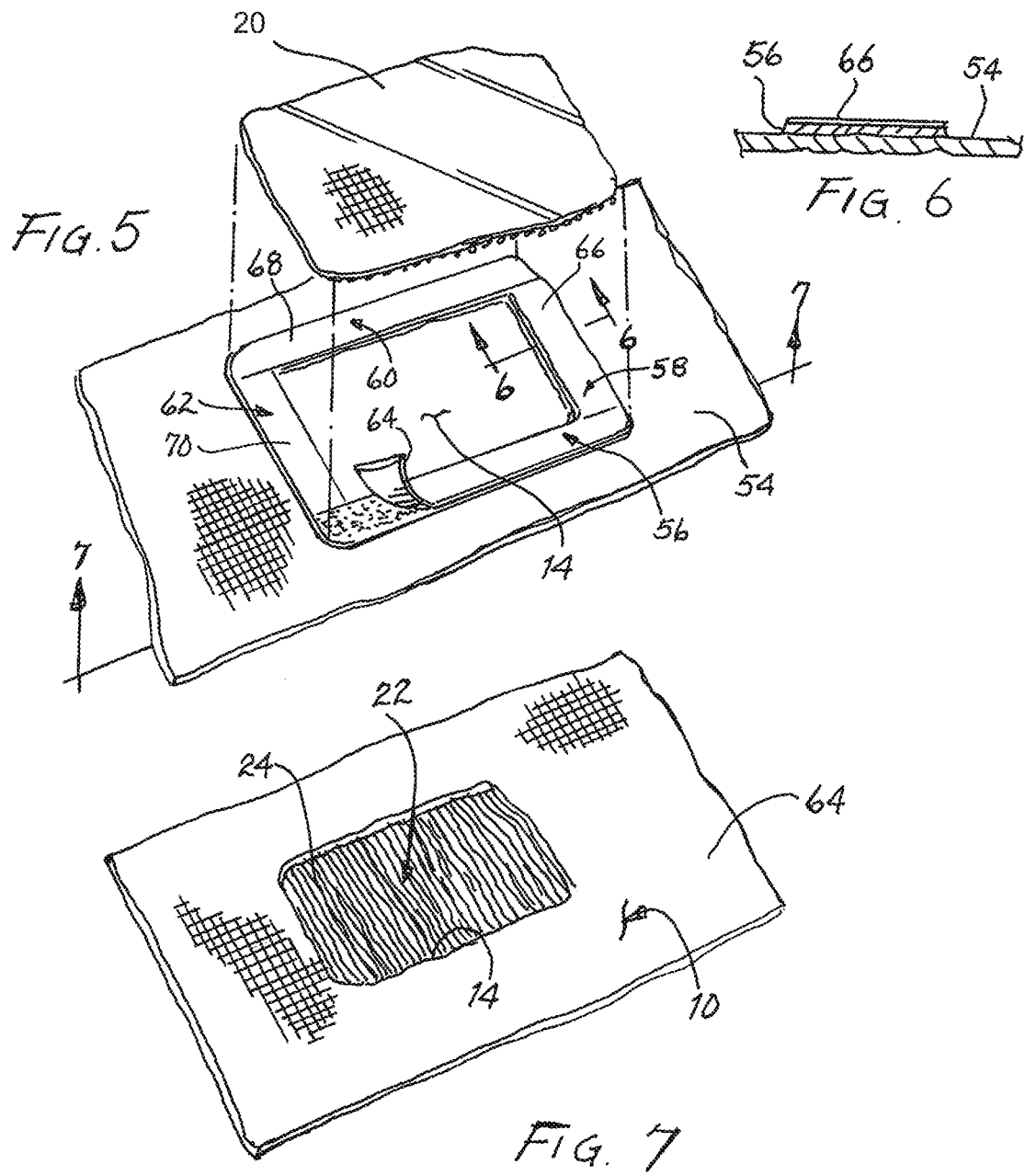

DISTRESSED FABRIC PATCH AND METHOD

CROSS REFERENCE TO RELATED APPLICATIONS

The present application includes subject matter disclosed in and claims priority to a nonprovisional patent application entitled "Distressed Fabric Patch and Method" filed Jun. 18, 2015 and assigned Ser. No. 14/743,219, now U.S. Pat. No. 10,149,507, which claims priority to a provisional patent application entitled "Method and Article for Patching Fabric Openings with a Distressed Fabric Patch" filed Nov. 10, 2014 and assigned Ser. No. 62/077,379 describing inventions made by the present inventor, both applications herein incorporated by reference.

BACKGROUND OF THE INVENTION

1. Field of the Invention

The present invention relates to patching the distressed area of a pair of denims and, more particularly, to a patch for replicating or for otherwise repairing a damaged distressed area of denim and a method for making same.

2. Description of Related Prior Art

Denim jeans, sometimes referred to as denim, are sometimes purposely distressed to create areas where only parallel threads remain. The purpose for doing so is to create so-called vintage jeans that are very popular with a certain segment of society. Denim jeans that have been worn over a period of time naturally develop such distressed areas.

Generally, the threads in a distressed area can render visible to some extent the underlying skin or garment. With normal wear, the threads in the distressed area become broken to a lesser or greater extent. The resulting lack of threads is generally considered unacceptable by the societal, group favoring vintage jeans.

To patch the damaged distressed area with a patch of denim sewn or otherwise attached to cover the distressed area at the front or the back, of the fabric is considered destructive of the vintage look.

Sometimes denim jeans become torn or otherwise damaged. Such damaged area can be trimmed to create a clear opening, which opening can be patched with a piece of denim fabric. If the denim jeans are vintage jeans and the intention is that of maintaining the look of vintage jeans, such look would be compromised.

SUMMARY OF THE INVENTION

The present invention is directed to repairing a damaged or distressed area in vintage jeans (denim) with a patch that will replicate the missing and/or damaged threads. The patch is basically secured to the inside surface of the denim in an overlapping relationship with the distressed area. The patch is formed by a plurality of parallel aligned threads secured to adhesive on one side of a transparent sheet. A piece of fabric, such as a see-through (translucent) fabric, is adhesively attached to the other side of the sheet to serve as a backing and support for the threads. The patch is cut to a size sufficient to overlap the damaged or distressed area and secured to the perimeter of the area at the back side of the denim by strips of adhesive circumscribing the area.

It is therefore a primary object of the present invention to preserve the look of vintage jeans after a distressed area has been damaged due to wear or otherwise.

Another object of the present invention is to provide an easily attachable patch for replicating the threads previously existing in a distressed area of denim.

Still another object of the present invention is to provide an inexpensive patch for the distressed area in denim.

Another object of the present invention is to provide an original look to a pair of damaged distressed denim jeans.

A further object of the present invention is to provide a patch easily mountable by a user to distressed areas of vintage jeans.

A still further object of the present invention is to provide a method for fabricating a patch for repairing a distressed area in denim.

A still further object of the present invention is to provide a method for patching the distressed area in a pair of vintage jeans.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates the leg of a pair of vintage jeans and showing a distressed area;

FIG. 2 illustrates the components of a patch for repairing the distressed area of a pair of vintage jeans;

FIG. 3 illustrates the patch incorporating the elements shown in FIG. 2;

FIG. 4 illustrates a cross sectional view taken along lines 4-4, as shown in FIG. 3;

FIG. 5 illustrates a method of securing the patch to the distressed area of a pair of vintage jeans;

FIG. 6 is a cross sectional view taken along line 6-6 as shown in FIG. 5;

FIG. 7 is a perspective view of the reverse side of the view shown in FIG. 5, and illustrates a section of a pair of vintage jeans wherein the distressed area has been repaired;

DESCRIPTION OF THE PREFERRED EMBODIMENT

Figure 8:
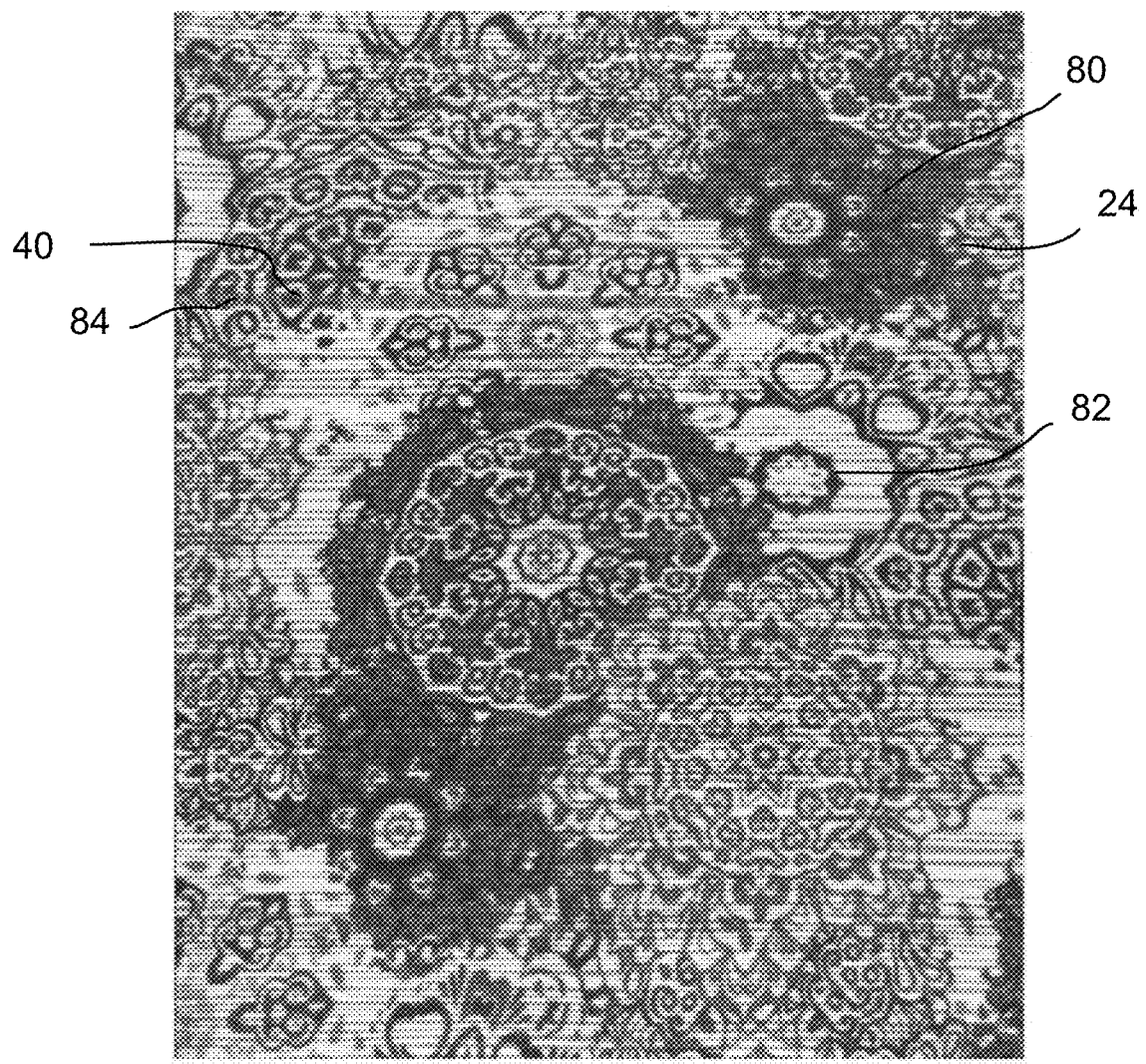
FIG. 8 is a top side view of a printed patch.

The term "distressed" in the context of denim jeans is a style of denim that is given a vintage look through manufacturing processes. This provides these denim jeans with a look that replicates the look found in conventional denim jeans that have been well worn by a wearer. Many manufacturers purposely fade or age the denim to give a vintage, worn look through methods set by stone washing, enzyme washing, acid washing, sand blasting, emerizing, micro sanding, etc. When these processes are taken to an extreme, fraying hems and seams create whiskers and even ripping and tearing of the denim. However, denim that comes through the stress does not mold to a user's body in the same way as conventional denim jeans.

Typically, distressed denim jeans have areas or discontinuities that are defined by parallel, vertically or horizontally oriented threads. Over a period of time, these threads may become broken to a greater or lesser extent. With some or more of the threads compromised, the skin or undergarment becomes visible. Sometimes, denim jeans become torn inadvertently or they are cut purposely to create a void or discontinuity.

Generally, vintage jeans provided by a manufacturer are relatively expensive because of the additional labor and equipment required to create a vintage (well worn) look. The present invention provides a patch for repairing the worn or damaged distressed area. Alternatively, the patch can be used to cover a deliberately cut void to create an inexpensive pair of vintage jeans.

Referring to FIG. 1 there is illustrated a pant leg 10 of a pair of distressed jeans covering the leg of a user 12. A distressed area 14 is located on the front portion of pant leg 10. The distressed area may be representative of a pair of distressed denim jeans or it may be representative of a patch attached to the inside surface of pant leg 10 to cover the discontinuity in the denim material and create/maintain the look of vintage jeans. For example, this could be an area cut out by the user in order to attach a patch constructed, in accordance with the present invention and to thereby provide a vintage look to the pair of denim jeans.

Referring to FIG. 2, the components of a patch 20 constructed in accordance with the teachings of the present invention are shown. A distressed thread bare front 22 may be constructed by either of two methods. First, a manufacturer may take a 36 inch by 60 inch fabric of bleached (white), natural dyed, stretch or standard denim (also known as twill). Two 28 inch by 36 inch rectangles are distressed using catting with various pressures and washings to break down the denim to nothing but thread bare horizontal weft fibers held together by a small frame of solid denim. Alternatively, cotton or a polyblend, both 20/2 and 10/2, of unmercerized standard stretchy yarn is wrapped around a 38 inch by 28 inch frame. The yarn is evenly wrapped across the surface of the frame to produce a plurality of spaced apart parallel threads. To positionally maintain the yarn, cotton muslin strips are glued along the edge of the frame to cover the threads that extend across the frame. This is done on opposed sides of the frame to produce sturdy borders to hold the threads in place. Irrespective of which process is used, it produces a plurality of parallel threads 24 retained in place by opposed borders 26, 28. As depicted by hash lines 30, 32, these borders are preferably of a fabric material.

A sheet 40 of double sided polyurethane panel having an adhesive on either side is cut to size with a margin commensurate with the distressed area 14 to be repaired. A suitable polyurethane panel with double sided adhesive is available from Adhesive Films, Inc., located in New Jersey and identified as BXF 546 0.003 or 0.006 gauge. Release paper is disposed on each side of the panel. Release paper 42 is peeled from one side of panel 40 to expose the underlying adhesive 44. Panel 40 is mated with distressed thread bare front 22 to adhere the threads thereto. Preferably, the adhesive is responsive to form a strong bond between threads 24 and panel 40. Backside 46 of panel 40 includes a further release paper 48 to protect the adhesive on the backside of the panel. A stability fabric sheet 50, which may be sheer cotton, tricot, denim, polyblend, organza, chiffon or other material, is adhered to backside 46 of panel 40 after removal of release paper 48.

The adhesive attendant both sides of panel 40 is heat responsive. A heat source, such as a conventional iron, may be applied to either or both parallel threads 24 and/or sheet 50 to ensure permanence.

Patch 20 is depicted in FIGS. 3 and 4. In particular, threads 24 are adhered to panel 40 by adhesive and thereby somewhat protected against damage. Sheet 50 is adhered to the backside of panel 40. As panel 40 may be transparent, the color and texture of sheet 50 may be more or less visible between threads 24. Accordingly, the selection of sheet 50 may be a function to complement or contrast with the surrounding material of pant leg 10.

Referring jointly to FIGS. 5 and 6, the method for attaching patch 20 to cover and overlap a distressed area 14 will be described. The distressed area is represented as a space without any threads extending from the perimeter thereof. However, this is not critical but the final effect will be more pleasing and acceptable if the perimeter of the distressed area is trimmed.

Inside surface 54 of pant leg 10 is depicted in FIG. 5 and patch 20 to be attached thereto. A plurality of strips, such as strips 56, 60, and 62 are like polyurethane panel 40 in having adhesive on opposed sides and covered by release paper. As depicted, strip 56 is attached along one edge of distressed area 14 after the release paper in the rear side of the strip has been removed. Strips 58, 60 and 62 are similarly attached around the perimeter of distressed area. Before removal of the release papers 64, 66, 68 and 70, heat may be applied to activate the adhesive adjacent the uncovered bottom of the strips 56, 58, 60 and 62.

After removal of strips 64, 66, 68 and 70, patch 20, after being trimmed to essentially correspond with the outside perimeter of the plurality of strips, is placed on the adhesive side of the strips. To activate the adhesive, heat may be applied to the patch to ensure that a firm or permanent bond will not fail during bending or twisting of the underlying material. A conventional iron used to iron garments has been found particularly useful to not only apply heat but also to compress the materials and form a strong bond.

FIG. 7 illustrates the exterior surface 64 of pant leg 10 after attachment of patch 20. As depicted, patch 20, at which threads 24 are clearly visible, extends across distressed area 14.

Indicia or artwork may be applied to the patch. The indicia may be printed in a method of Direct to Garment (DTG) printing as is known in the art. The indicia may be printed onto the side-by-side threads prior to construction of the patch, after the patch is constructed, or alter the product is applied to the garment. When printing on the side-by-side threads prior to construction of the patch, a panel of side-by-side threads is sent through a garment printer, as is known in the art for DTG, to print an indicia (such as a logo, artwork, statement, image, pattern, etc.) onto the side-by-side threads. The threads are then cut to smaller unit sizes for construction of the patch. Indicia may be direct printed onto a large side-by-side thread fabric panel with ink. A silk-screening printing method may be used on the threads, or on the constructed patch, or on the garment with applied patch.

Dye-sublimation may be used to print onto the threads. Digital printing may be used to apply full color artwork to transfer images to polyester and polymer-coated substrate. The threads may be likewise comprised of polyester, or suitable coated. CMYK printers can combine ink for printing many colors, unlike screen printing which requires screens for each color of the design. Dye-sublimated printing may permanently dye the threads, and or the underlying substrate (panel). When printing, it is considered that the threads contain a primary print, while the space there between can be filled, or printed below onto the substrate as a complementary printing. Similarly, with screen printing, onto a patch, or garment, the ink may be coated onto the threads, and spill over onto the substrate. The indicia is printed through on some parts and the adhesive (or underlying panel) stops/captures it in others.

Screen printing may be used to create indicia on the threads whereby a mesh is used to transfer ink onto a substrate, except in areas made impermeable to the ink by a blocking stencil. A blade or squeegee is moved across the screen to fill the open mesh apertures with ink, and an optional reverse stroke then causes the screen to touch the threads (and, in some cases, the underlying substrate) momentarily along a line of contact. This causes the ink to wet the threads and be pulled out of the mesh apertures as the screen springs back after the blade has passed. One color is printed at a time, so several screens can be used to produce a multi-colored image or design.

Figure 9:
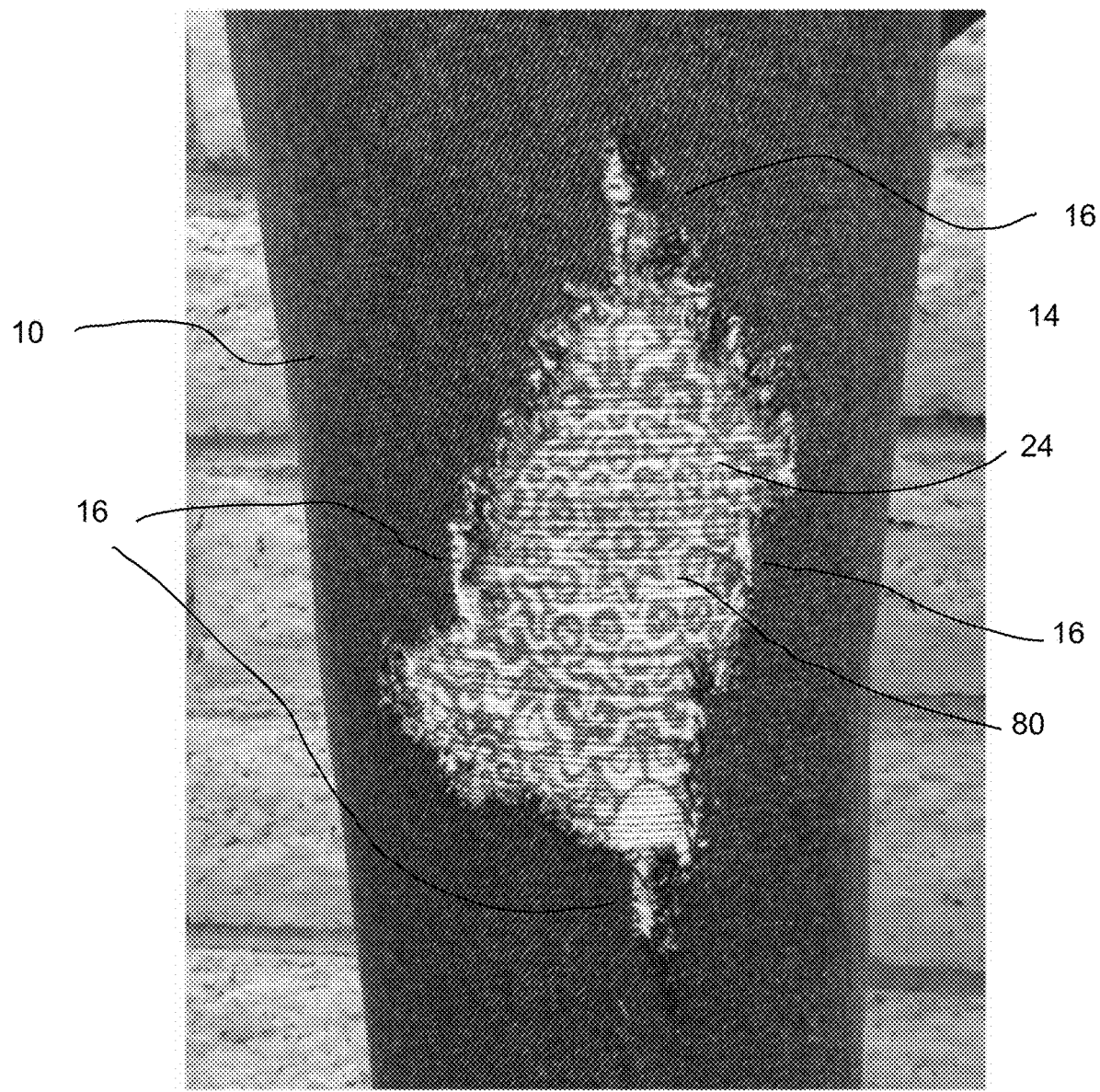
FIG. 9 illustrates the patch as applied to a pant leg.
Figure 10:
FIG. 10 illustrates a top view of the patch as applied to an article of clothing.

As can be seen in FIGS. 8-10, patch can be applied to an article of clothing, such as pant leg 10. The plurality of parallel threads 24 can be seen through a discontinuity, such as distressed area 14, threads viewable from front side through the discontinuity. As discussed herein, while the term "parallel" has a mathematical definition, the use of the term "parallel" herein refers to the type of threads shown herein. Furthermore, the "parallel" threads of the present invention may be distinguished from manufactured, sewn, woven threads, etc. in that they deviate from literal parallel.

Threads 24 are placed over panel 40. Indicia 80 is printed thereon. In some cases, the indicia will only be printed on threads. In embodiments shown, the indicia 80 is printed primarily on the threads as primary indicia 82, while the exposed portions of the panel 40 may include secondary, or complementary indicia 84 (wherein the secondary indicia fills the gaps of the primary indicia between the threads).

The distressed area 14 may include edges 16, including clean edge 16, and a rough edge 18 with excess strings extending therefrom.

From the above description, it is self evident that a pair of vintage denim jeans which have been damaged or are damaged resulting in a void/opening can be reconstructed to provide the same visual impression, as the original vintage denim jeans. Additionally, any tears or other damaged section of the garment can be trimmed to provide a distressed area for attaching a patch constructed in accordance with the present invention and thereby provide a pair of denim jeans with a vintage look.

I claim:
1. A patch for covering a discontinuity in a denim garment, said patch comprising:
   (a) a first double-sided adhesive panel comprising a first adhesive;
   (b) a plurality of side-by-side threads, wherein said plurality of threads forms a thread panel, a bottom side of said thread panel adhered to a first side of said first double-sided adhesive panel;
   (c) a fabric material adhered to a second side of said first double-sided adhesive panel; and
   (d) a second double-sided adhesive panel, comprising a second adhesive, said second double-sided adhesive panel adhered over a top side of said thread panel.

2. The patch as set forth in claim 1 wherein said first double-sided adhesive panel includes a release paper disposed on each side of said first double-sided adhesive panel to protect the first adhesive prior to use of said first double-sided adhesive panel.

3. The patch as set forth in claim 2 wherein the second adhesive of said second double-sided adhesive panel is heat activated.

4. The patch as set forth in claim 1 wherein the denim garment includes a front side and a back side, and further comprising a plurality of double-sided strips being attached to the back side.

5. The patch as set forth in claim 4 wherein said thread panel is visible through said discontinuity from said front side.

6. The patch as set forth in claim 1 wherein said first double-sided adhesive panel comprises polyurethane adhesive.

7. The patch as set forth in claim 1 wherein said second double-sided adhesive panel comprises polyurethane adhesive.

8. The patch as set forth in claim 1 wherein said thread panel comprises an indicia.

9. The patch as set forth in claim 8 wherein said indicia comprises ink printed onto said thread panel.

10. The patch as set forth in claim 8 wherein said first double-sided adhesive panel comprises a complementary indicia.

11. The patch as set forth in claim 10 wherein said complementary indicia comprises ink.

* * * * *